United States Patent Office 3,057,259
Patented Oct. 9, 1962

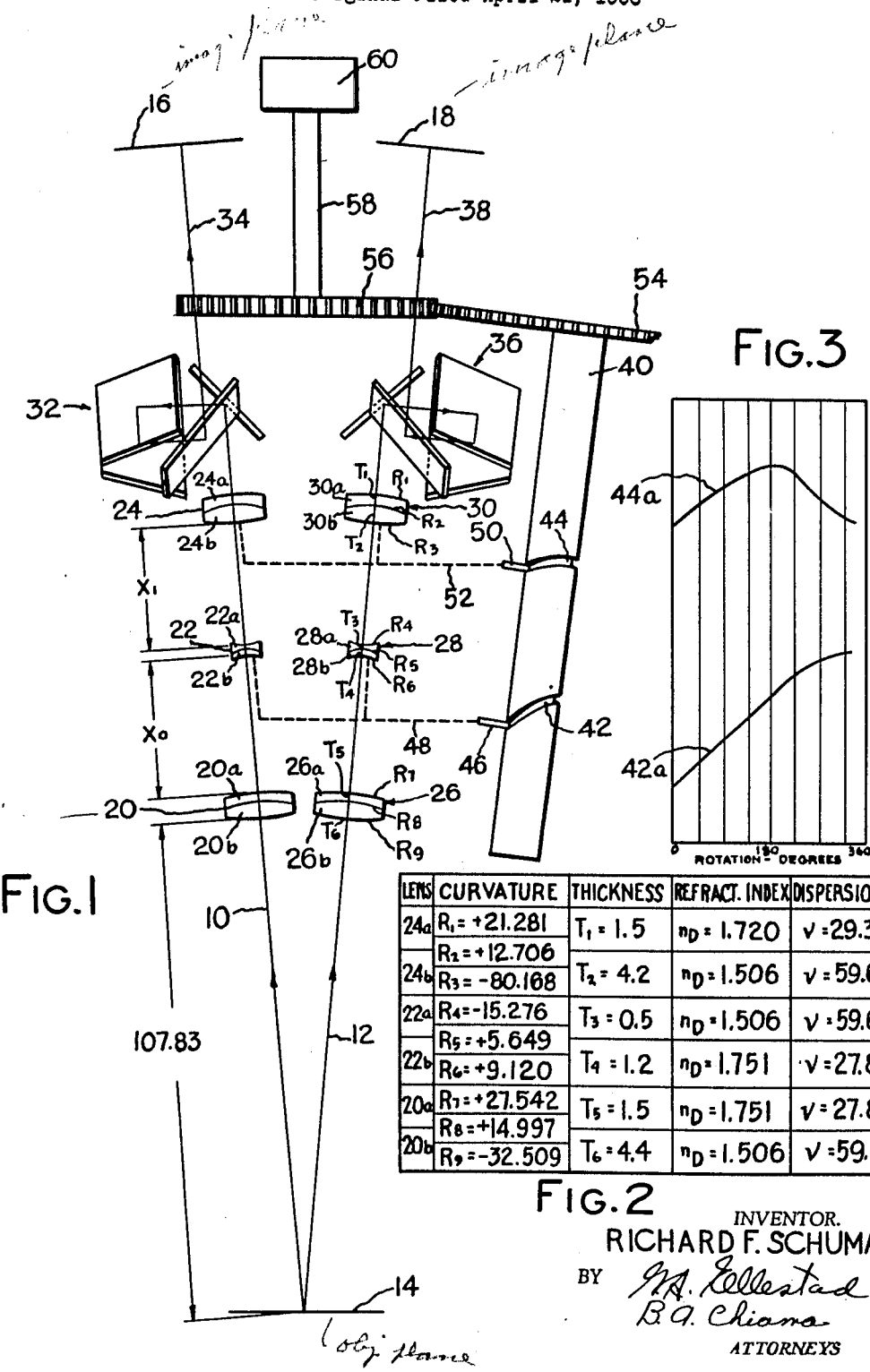

3,057,259
VARIABLE MAGNIFICATION OPTICAL SYSTEMS
Richard F. Schuma, Santa Barbara, Calif., assignor to Bausch & Lomb Incorporated, Rochester, N.Y., a corporation of New York
Continuation of application Ser. No. 729,800, Apr. 21, 1958. This application June 22, 1961, Ser. No. 120,887
2 Claims. (Cl. 88—57)

This invention relates to a variable magnification optical system suitable for incorporation into a microscope to produce an image having a continuously variable magnitude of an object at a fixed distance from the image plane of the microscope.

This is a continuation of my copending application Ser. No. 729,800, filed April 21, 1958, now abandoned.

The invention is specially adapted for stereomicroscopes of the Greenough type wherein the two optical systems are inclined to each other so that the focal plane of each system is inclined with respect to the object plane. When introducing a variable magnification system, a great number of lens elements are usually needed in order to correct the aberrations to produce a satisfactory image for all magnifications of the system. Therefore, it is the principal object of the present invention to provide a stereomicroscope with a variable magnification system wherein a minimum of lens elements is employed but adequate correction for aberrations is attained.

Another object of the invention is to provide a magnification system for a stereomicroscope which may be varied continuously through the limits of the system.

Another object of the invention is to permit relatively large variations of magnification without necessarily increasing the overall length of the microscope.

The present invention provides a variable magnification optical arrangement which is adapted to be incorporated into the objective section of a stereomicroscope and comprises a duplicate pair of lens systems or objectives, each of which in turn comprises two positive lenses and a negative lens spaced therebetween. One positive lens of each objective nearest the object to be viewed is held stationary while the other positive lens and the negative lens of the pair are adapted to be moved axially with respect to each other and the stationary lenses. The positive and negative lens elements of each objective are moved at different rates in accordance with the characteristics of precalculated data for each of the lens elements and suitable means such as camming surfaces, which have their surfaces defined in accordance with the data, may be employed to effect movement of the lens elements accordingly.

Other objects and advantages of the invention will become apparent from the following description taken in conjunction with the accompanying drawing, wherein:

FIG. 1 is a schematic illustration of a variable magnification optical arrangement in accordance with the present invention as applied to a stereomicroscope;

FIG. 2 is a table supplying constructional information for the particular lens elements utilized in the present invention; and FIG. 3 is a diagrammatic illustration of the movement of each of the movable lens elements of the present invention.

Referring now to the drawing and more particularly to FIG. 1, there is shown a schematic optical arrangement of the objective section of a stereomicroscope wherein the numeral 10 designates the optical axis for one of the objectives and the numeral 12 designates the optical axis for the other objective. The binocular eyepieces and the mounting means therefor for the illustrated arrangement are not shown since these structures are well known in the art and further description thereof is unnecessary.

For purposes of illustrating the application of the present invention, a stereomicroscope of the Greenough type is illustrated wherein the two optical systems or objectives of the instrument are inclined to each other as indicated by the angular relationship between the axes 10, 12. Since the axes are inclined and converge to a point on an object plane, here indicated by the numeral 14, the respective image planes 16, 18 for each of the objectives will also be inclined to the object plane. In this type of instrument, the distance between the object plane and the image planes is relatively constant and the present invention is especially designed in order to maintain this constant while at the same time utilizing means for continuously varying the magnification of the image.

One of the variable magnification objectives includes a set of three achromatic lenses 20, 22 and 24 which are arranged in the optical axis 10 of the illustrated microscope. Similarly, the other objective includes corresponding duplicate lenses 26, 28 and 30 arranged in the optical axis 12. As shown in FIG. 1, the lenses 20 and 26 as well as lenses 24 and 30 are positive, that is, have plus powers, whereas, lenses 22 and 28 are negative or have minus powers. The lenses 20 and 26 each comprises two component lenses 20a, 20b and 26a, 26b, respectively, in cemented contact and are held stationary with respect to the object plane 14 by any suitable frame (not shown). The lenses 22 and 28 each comprises two component lenses 22a, 22b and 28a, 28b, respectively, in cemented contact and the lenses 24 and 30 each comprises two component lenses 24a, 24b and 30a, 30b, respectively, also in cemented contact. The various lens elements and component lenses have the optical properties listed in the table of FIG. 2.

A mirror arrangement 32 serves to direct the image forming rays, traveling along the optical axis 10, into an eyepiece (not shown) having an optical path 34 for the image plane 16. In like manner, a mirror arrangement 36 associated with the optical axis serves to direct image rays along an optical path 38 for another eyepiece (not shown) for the image plane 18.

The following is a table of values of constructional information for the various lens components of a specific embodiment of the present invention:

| Lens | Radii | Thickness | Refractive index | Dispersion |
|---|---|---|---|---|
| 24a and 30a | $R_1=+21.281$ $R_2=+12.706$ | $T_1=1.5$ | $n_D=1.720$ | 29.3 |
| 24b and 30b | $R_3=-80.168$ | $T_2=4.2$ | $n_D=1.506$ | 59.6 |
| 22a and 28a | $R_4=-15.276$ $R_5=+5.649$ | $T_3=0.5$ | $n_D=1.506$ | 59.6 |
| 22b and 28b | $R_6=+9.120$ | $T_4=1.2$ | $n_D=1.751$ | 27.8 |
| 20a and 26a | $R_7=+27.542$ $R_8=+14.997$ | $T_5=1.5$ | $n_D=1.751$ | 27.8 |
| 20b and 26b | $R_9=-32.509$ | $T_6=4.4$ | $n_D=1.506$ | 59.6 |

The radii in the table refer to the various surfaces of the lens elements, and are designated plus or minus according to whether the surfaces are concave or convex as viewed from above as viewed in the drawing. Thickness refers to the thickness of the central portions of the respective elements, that is, taken along their optical axes. The dimensions may be expressed in any desired units such as, for example, millimeters, so long as all the linear dimensions are in the same units. The refractive indices and dispersions are dimensionless quantities, and are not affected by the selection of the dimensional units for the radii and thicknesses.

From the dimensions and indices given in the table, the following powers of the lenses, in terms of their focal lengths may be calculated according to well known optical principles:

The front elements 20 and 26—+38.45 units
The negative elements 22 and 28——13.9
The fixed elements 24 and 30—+42.91

With the axial separation between the lens elements 20, 22 and 26, 28 denoted by $X_0$ in FIG. 1 and the axial separation between the lens elements 22, 24 and 28, 30 denoted by $X_1$, the following table indicates the relative magnifications of the objectives for certain values $X_0$ and $X_1$ in accordance with the principles of the present invention, with the lens arrangements continually in focus on an object at a finite distance:

| $X_0$ | $X_1$ | Magnification |
|---|---|---|
| 14.20 | 33.765 | 0.700 |
| 16.20 | 33.443 | 0.740 |
| 18.20 | 33.187 | 0.787 |
| 20.20 | 32.751 | 0.843 |
| 22.20 | 32.176 | 0.911 |
| 24.20 | 31.415 | 0.995 |
| 26.20 | 30.397 | 1.100 |
| 28.20 | 29.018 | 1.238 |
| 30.20 | 27.110 | 1.422 |
| 32.20 | 24.386 | 1.690 |
| 34.20 | 20.328 | 2.096 |
| 36.20 | 13.863 | 2.785 |
| 36.70 | 11.627 | 3.031 |

It will be apparent from a study of the above values for $X_0$ and $X_1$ that if the pairs of lens elements 22, 28 and 24, 30 are moved slowly from their positions where $X_0$ is 14.20 units and $X_1$ is 33.765 units to the positions where $X_0$ is 36.70 units and $X_1$ is 11.627 units, each of the objectives will vary continuously in magnification between .700 to 3.031. In order to achieve this continuous variation in magnification, the movement of each pair of lens elements 22, 28 and 24, 30 is made to follow empirical curves which have been derived from the above data.

The relationship of the movements of each pair of lens elements 22, 28 and 24, 30 with respect to one another and to the stationary lens elements 20, 26, respectively, is as follows (for brevity, only the objective associated with the optical axis 10 will be considered):

By definition $M = m_{20} \cdot m_{22} \cdot m_{24}$
Where
$M$ = magnification of the objective system
$m_{20}$ = magnification of lens element 20
$m_{22}$ = magnification of lens element 22
$m_{24}$ = magnification of lens element 24

For any of the three lens elements the magnification is, by definition, equal to the image distance divided by the object distance. The range of magnification for a lens element is equal to its maximum magnification divided by its minimum magnification.

If the magnification of lens element 20 is made constant,
that is
$$m_{20} = A \quad (1)$$
then
$$M = A \cdot m_{22} \cdot m_{24}$$

The present objective lens system works through a magnification range R given by $$R = \frac{M_{max.}}{M_{min.}} \quad (2)$$

where $M_{max.}$ = maximum magnification of system
and $M_{min.}$ = minimum magnification of system By substitution, Equation 2 becomes $$R = \frac{A \cdot m_{22}\ max. \cdot m_{24}\ max.}{A \cdot m_{22}\ min. \cdot m_{24}\ min.}$$

or $$R = \frac{m_{22}\ max. \cdot m_{24}\ max.}{m_{22}\ min. \cdot m_{24}\ min.} \quad (3)$$

since the magnification of lens element 20 is constant and therefore has a range of magnification of unity.

In the present invention, the magnification of the lens element 24 is held to practically a fixed value for its full operating range, and, as will presently be illustrated, the percent of change of magnification of the lens element 24 between the extreme limits of the separation of the lens elements, is held to below 3%. With the magnification of the lens element 24 practically fixed, its range of magnification is practically unity. Therefore, Equation 3 becomes $$R \simeq \frac{m_{22}\ max.}{m_{22}\ min.} \quad (4)$$

In words, this would indicate that the range of variation of magnification of the objective which comprises the lens elements 20, 22 and 24 is approximately eual to the range of variation of magnification of the lens element 22. A few examples set forth below will illustrate this relationship:

(1.) With the total magnification of the objective at −0.700 (low magnification), the following magnification of the various lens elements were determined:

Lens element 20 was −0.54
Lens element 22 was −0.48
Lens element 24 was −2.73

(2.) With the total magnification at −1.51 (intermediate magnification)

Lens element 20 was −0.54
Lens element 22 was −1.12
Lens element 24 was −2.50

(3.) With the total magnification at −3.03 (high magnification)

Lens element 20 was −0.54
Lens element 22 was −2.10
Lens element 24 was −2.65

From this information, it will be obvious that for the full range of magnification for the objective, the magnification of the lens element 20 remained constant, and therefore its range was unity.

By substituting in Equation 2

$$R = \frac{M\ max.}{M\ min.}$$

$$R = \frac{-3.03}{-0.7} = 4.33,\ \text{the total magnification range of the objective}$$

The range of magnification for lens elements 22 is $$R_{22} = \frac{-2.10}{-0.48} = 4.37$$

which is approximately equal to the total magnification range R. Therefore, the exactness of equation 4 namely $$R \simeq \frac{m_{22}\ max.}{m_{22}\ min.}$$

is very close.

From the above data, it will also be noted that the percent of change in the magnification of the lens element 24 is very low, or for all practical purposes is constant. To illustrate, in Example 1, the magnification of the element 24 is −2.73 whereas in Example 2, it is −2.50, or a 8.5% change. Comparing Examples 1 and 3, that is, for the values thereof between the extreme magnifications of the objective, the change is 2.9%.

In order to effect the above relationships of magnification ranges, the lens elements 22 and 24 are moved between their extreme limits of movement in accordance with empirical data which may be utilized for preparing a motion generating mechanism for so moving the lens elements. For purposes of illustration, the empirical data may be used for the design of a pair of grooves which may serve as cams for driving the lens elements 22, 24 in prearranged paths.

In FIG. 1, there is illustrated a cylinder element 40 having a pair of grooves 42, 44 formed on the periphery thereof and in spaced relation with respect to each other. The groove 42 has associated therewith a cam follower 46 which is suitably connected by a mechanical linkage 48 to the lens elements 22 and 28. Similarly, the groove 44 has associated therewith a cam follower 50 which is connected by a mechanical linkage 52 to the lens elements 24 and 30. Means (not shown) may be provided for mounting the cylinder 40 for rotation about its axis while preventing displacement thereof. Upon rotation of the cylinder, the lens elements 22 and 28 will be driven simultaneously along their respective optical axes and with a movement determined by the shape or design of the cam groove 42. This rotation will also impart simultaneous movement to the lens elements 24 and 30 along their respective optical axes and with a movement determined by the design of the cam groove 44.

From the above table of values for the separations $X_0$ and $X_1$, it will be obvious that the movement of the elements 22, 28 will be quite different from the movement of the lens elements 24, 30 and consequently the designs of the cam grooves 42, 44 will be different. In fact, as the cam cylinder 40 is continuously rotated for the full range of movement of the lens elements, the rate of movement of the elements 22, 28 will be different from that of the elements 24, 30.

In FIG. 3, a graphic illustration is shown of the movements traced out by the pairs of lens elements 22, 28 and 24, 30 as the same move between their extreme limits of movement. The curve 42a illustrates the movement of the pair of elements 22, 28 while the curve 44a illustrates the movement of the pair of lens elements 24, 30. Actually, these curves result from tracing on suitable graph paper, the data noted in the above table and may be utilized as a layout for the grooves 42, 44.

With a total magnification of each of the objectives at −0.70, the pairs of lens elements 22, 28 and 24, 30 will be spaced apart a distance corresponding to the spacing between the curvces 42a, 44a at 0°. As seen in FIG. 3, as the lens elements are moved in order to increase the magnification of the system, each pair of lens elements 22, 28 and 24, 30 travel in the same direction but at different rates. At a point slightly beyond the midpoint of the movement range, the pair of lens elements 24, 30 gradually reverses its direction of movement and further movement thereof is in a direction toward the pair 22, 28. It will be noted after a study of the data in the above table and the curves in FIG. 3, that the pairs of lens elements 22, 28 and 24, 30 move toward each other during full travel thereof. This results from the faster rate of movement of the pair 22, 28 toward the pair 24, 30 than the latter's movement away from the former.

Rotation of the cylinder 40 is accomplished by a gear train comprising a gear 54 directly connected to the cylinder and another gear 56 in mesh with gear 54. A shaft 58 and a knob 60, connected thereto, serves to cause rotation of the gear 56 upon rotation of the knob. In operation, manual rotation of the knob 60 will impart rotation of the cylinder 40 and thereby move the lens elements 22, 28 and 24, 30 accordingly. If the rotation is initiated when the total magnification of each of the objectives is at −0.70, continuous uniform rotation of the cylinder 40 will cause a continuous uniform increase in magnification of the objectives until the maximum magnification of −3.03 is attained.

The two movable lens elements for each of the objectives are constrained to move along their respective optical axes so that there is no lateral displacement of the image when magnification is changed. The motion of the movable lens elements is such that the distance between the fixed lens element and the corresponding image remains constant, in which case, the image will remain in focus as the magnification is varied.

In a system composed of three cemented doublets, parameter changes in the lens elements on the object side of the system will most greatly affect the aberrations at the high magnification end of the range, while similar changes in the lens elements on the image side of the system will most greatly affect the aberrations at the low end of the range. It is possible to correct the aberrations at any two points in the magnification range and these points of correction may be adjusted so that the aberration errors, in terms of tolerances, may be balanced over the range.

From the foregoing, it will be appreciated that a variable magnification objective system is provided for application to a stereomicroscope wherein a minimum number of lens elements are employed to give adequate correction of the aberrations. The optical properties of the lens elements and their movements along their respective optical axes permits the use of the objectives within a relatively small and confined space while still retaining the ability for continuous magnification without the necessity of refocusing. While an objective system comprising a pair of objectives has been described, a single objective having a three-lens element arrangement may be utilized to relay an image formed by another fully corrected lens system wherein the image formed by the latter becomes an object for the variable magnification system disclosed.

I claim:

1. A variable magnification lens system having a fixed object plane and a relatively fixed image plane comprising a movable positive lens element, a movable negative lens element and a stationary positive lens element all arranged along a common optical axis with the negative lens element being spaced between the positive lens elements, and means for continuously varying the magnification of the lens system including means for continuously and simultaneously moving said two movable lens elements at different rates along the optical axis and for a greater portion of its movement in the same direction, said lens elements having optical characteristics of the following order wherein R is the radius of the lens refracting surfaces in millimeters, T is the axial thickness of the lens elements in millimeters, $n_D$ is the refractive index of the lens element materials and $\nu$ is the dispersion power of the lens element materials:

| Radii | Thickness | Refractive index | Dispersion |
|---|---|---|---|
| $R_1 = +21.281$ | $T_1 = 1.5$ | $n_D = 1.720$ | $\nu = 29.3$ |
| $R_2 = +12.706$ | | | |
| $R_3 = -80.168$ | $T_2 = 4.2$ | $n_D 1.506$ | $\nu = 59.6$ |
| $R_4 = -15.276$ | $T_3 = 0.5$ | $n_D = 1.506$ | $\nu = 59.6$ |
| $R_5 = +5.649$ | | | |
| $R_6 = +9.120$ | $T_4 = 1.2$ | $n_D = 1.751$ | $\nu = 27.8$ |
| $R_7 = +27.542$ | $T_5 = 1.5$ | $n_D = 1.751$ | $\nu = 27.8$ |
| $R_8 = +14.997$ | $T_6 = 4.4$ | $n_D = 1.506$ | $\nu = 59.6$ |
| $R_9 = -32.509$ | | | | the spacing between said negative lens element and said movable positive lens element being variable about a mean distance of about 25 millimeters, and the spacing between said negative lens element and said stationary positive element being variable about a mean distance of about 23 millimeters.

2. A variable magnification lens system according to claim 1 further characterized as to the air spaces between its respective lens elements, such air spaces being as follows:

$$X_1 = \begin{cases} 11.627 & \text{(when producing high magnification)} \\ 31.415 & \text{(when producing unity magnification)} \\ 33.765 & \text{(when producing low magnification)} \end{cases}$$

$$X_0 = \begin{cases} 36.70 & \text{(when producing high magnification)} \\ 24.20 & \text{(when producing unity magnification)} \\ 14.20 & \text{(when producing low magnification)}. \end{cases}$$

No references cited.